United States Patent
Horn et al.

(10) Patent No.: US 9,848,314 B2
(45) Date of Patent: Dec. 19, 2017

(54) MANAGING DISCOVERY IN A WIRELESS PEER-TO-PEER NETWORK

(75) Inventors: Gavin Bernard Horn, La Jolla, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/123,328

(22) Filed: May 19, 2008

(65) Prior Publication Data
US 2009/0287827 A1    Nov. 19, 2009

(51) Int. Cl.
| | |
|---|---|
| G06F 15/173 | (2006.01) |
| G06F 15/16 | (2006.01) |
| H04L 12/28 | (2006.01) |
| G06F 1/26 | (2006.01) |
| G06F 1/00 | (2006.01) |
| G06F 1/12 | (2006.01) |
| G04F 1/04 | (2006.01) |
| H04W 4/00 | (2009.01) |
| H04W 8/00 | (2009.01) |
| H04L 12/24 | (2006.01) |
| H04L 29/08 | (2006.01) |
| H04W 84/18 | (2009.01) |
| H04W 52/02 | (2009.01) |
| H04W 48/16 | (2009.01) |

(Continued)

(52) U.S. Cl.
CPC ............ *H04W 8/005* (2013.01); *H04L 41/12* (2013.01); *H04L 67/125* (2013.01); *H04W 48/10* (2013.01); *H04W 48/16* (2013.01); *H04W 52/0245* (2013.01); *H04W 84/12* (2013.01); *H04W 84/18* (2013.01); *Y02B 60/50* (2013.01); *Y04S 40/164* (2013.01)

(58) Field of Classification Search
CPC ..... H04W 84/12; H04W 84/18; H04W 48/16; H04W 8/005; H04W 48/10; H04W 52/0245; H04L 41/12
USPC ...... 370/254, 338; 455/414.1, 421; 709/225, 709/227, 234, 237; 713/320, 323, 324, 713/401, 502
See application file for complete search history.

(56) References Cited

U.S. PATENT DOCUMENTS

| | | |
|---|---|---|
| 7,286,529 B1 | 10/2007 | Thomas |
| 7,397,789 B2 | 7/2008 | Chari et al. |
| 7,593,999 B2 | 9/2009 | Nathanson |

(Continued)

FOREIGN PATENT DOCUMENTS

| | | |
|---|---|---|
| CN | 1989741 A | 6/2007 |
| EP | 1653676 A1 | 5/2006 |

(Continued)

OTHER PUBLICATIONS

Title: "IEEE 802.16e Sleep Mode" Publication: 2003 Author: Kitroser et al.*

(Continued)

*Primary Examiner* — Taylor Elfervig
(74) *Attorney, Agent, or Firm* — Holland & Hart LLP (57) ABSTRACT

Apparatuses and methods are disclosed for managing discovery in wireless peer-to-peer networks. Various discovery procedures may be implemented by supporting a broadcast of a plurality of discovery signals spaced apart in time by silent periods from a peer node and changing the duration of at least one of the silent periods.

38 Claims, 9 Drawing Sheets

(51) Int. Cl.
*H04W 84/12* (2009.01)
*H04W 48/10* (2009.01)

(56) References Cited

U.S. PATENT DOCUMENTS

| | | | |
|---|---|---|---|
| 7,720,962 | B2 | 5/2010 | Gupta et al. |
| 8,135,443 | B2 | 3/2012 | Aleksic et al. |
| 2002/0184385 | A1* | 12/2002 | Kato .............................. 709/237 |
| 2003/0051030 | A1* | 3/2003 | Clarke et al. ................. 709/224 |
| 2003/0208595 | A1* | 11/2003 | Gouge et al. ................. 709/225 |
| 2003/0220118 | A1 | 11/2003 | Chhabra |
| 2004/0042434 | A1* | 3/2004 | Kennedy ....................... 370/338 |
| 2004/0072434 | A1 | 4/2004 | Maruyama |
| 2005/0063348 | A1 | 3/2005 | Donovan |
| 2005/0075148 | A1* | 4/2005 | Park .............................. 455/574 |
| 2005/0208966 | A1* | 9/2005 | David et al. ................ 455/553.1 |
| 2006/0159032 | A1 | 7/2006 | Ukrainetz et al. |
| 2006/0258338 | A1* | 11/2006 | Markki et al. ............. 455/414.1 |
| 2007/0050761 | A1* | 3/2007 | Hester et al. ................. 717/168 |
| 2007/0082249 | A1 | 4/2007 | Shu et al. |
| 2007/0121521 | A1* | 5/2007 | D'Amico et al. ............ 370/252 |
| 2007/0124721 | A1* | 5/2007 | Cowing et al. ............... 717/100 |
| 2007/0171910 | A1 | 7/2007 | Kumar |
| 2007/0178876 | A1 | 8/2007 | Yaqub et al. |
| 2007/0286136 | A1* | 12/2007 | Rittle et al. .................... 370/338 |
| 2008/0031210 | A1* | 2/2008 | Abhishek et al. ............ 370/338 |
| 2008/0043656 | A1 | 2/2008 | Yoon et al. |
| 2008/0043665 | A1 | 2/2008 | Jeon et al. |
| 2008/0107089 | A1* | 5/2008 | Larsson et al. ............... 370/338 |
| 2008/0112334 | A1* | 5/2008 | Laroia et al. ................. 370/254 |
| 2008/0270814 | A1* | 10/2008 | Starr et al. ..................... 713/323 |
| 2008/0273485 | A1 | 11/2008 | Tsigler et al. |
| 2009/0285119 | A1 | 11/2009 | Horn et al. |
| 2010/0278087 | A1 | 11/2010 | Kawakami et al. |
| 2014/0092749 | A1* | 4/2014 | Hui et al. ....................... 370/238 |
| 2014/0093749 | A1 | 4/2014 | Yang et al. |

FOREIGN PATENT DOCUMENTS

| | | |
|---|---|---|
| EP | 1740001 A1 | 1/2007 |
| EP | 1768425 A1 | 3/2007 |
| GB | 2423891 | 9/2006 |
| JP | 2004048503 | 2/2004 |
| JP | 2005064722 A | 3/2005 |
| JP | 2005123781 A | 5/2005 |
| JP | 2005529514 A | 9/2005 |
| JP | 2005303998 A | 10/2005 |
| JP | 2006217178 A | 8/2006 |
| JP | 2007013989 A | 1/2007 |
| JP | 2007129542 A | 5/2007 |
| JP | 2007158418 A | 6/2007 |
| JP | 2007184827 A | 7/2007 |
| JP | 2007202134 A | 8/2007 |
| JP | 2007311867 A | 11/2007 |
| RU | 2005113877 A | 10/2005 |
| RU | 2320008 C2 | 3/2008 |
| TW | 200629949 A | 8/2006 |
| TW | 200814811 A | 3/2008 |
| WO | 2007044597 | 4/2007 |
| WO | 2007082252 | 7/2007 |
| WO | 2008023638 A1 | 2/2008 |
| WO | 2008027975 A2 | 3/2008 |
| WO | 2009142627 | 11/2009 |

OTHER PUBLICATIONS

K. Balachandran and J. H. Kang, "Neighbor Discovery With Dynamic Spectrum Access In Adhoc Networks," 2006 IEEE 63rd Vehicular Technology Conference, Melbourne, Vic., 2006, pp. 512-517.*

L. Galluccio, G. Morabito and S. Palazzo, "Analytical evaluation of a tradeoff between energy efficiency and responsiveness of neighbor discovery in self-organizing ad hoc networks," in IEEE Journal on Selected Areas in Communications, vol. 22, No. 7, pp. 1167-1182, Sep. 2004.*

D. Angelosante, E. Biglieri and M. Lops, "Neighbor Discovery for Wireless Networks," 2007 IEEE International Symposium on Information Theory, Nice, 2007, pp. 826-830.*

Buford J et al: "Sleeper: A Power-Conserving Service Discovery Protocol" Mobile and Ubiquitous Systems: Networking & Services, 2006 Third a Nnual International Conference on, IEEE, PI, Jul. 1, 2006 (Jul. 1, 2006), pp. 1-10, XP031068689 ISBN: 978-1-4244-0498-8 abstract p. 6, left-hand column, lines 10-31.

Hyoil Kim et al: "Efficient Discovery of Spectrum Opportunities with MAC-Layer Sensing in Cognitive Radio Networks" IEEE Transactions on Mobile Computing, IEEE Service Center, Los Alamitos, CA, US, vol. 6, No. 5, May 1, 2008 (May 1, 2008), pp. 533-545, XP011202036 ISSN: 1536-1233 the whole document.

Iinvitation to Pay Additional Fees—PCT/US2008/064275, International Search Authority—European Patent Office—dated Feb. 4, 2009.

International Search Report and the Written Opinion PCT/US2008/064275, International Search Authority—European Patent Office—dated May 29, 2009.

International Search Report and the Written Opinion PCT/US2008/064277, International Search Authority—European Patent Office—dated Feb. 11, 2010.

Kaisen Lin et al: "Data Discovery and Dissemination with DIP" Information Processing in Sensor Networks, 2008. IPSN "08. International Conference on, IEEE, Piscataway, NJ, USA, Apr. 22, 2008 (Apr. 22, 2008), pp. 433-444, XP031246730 ISBN: 978-0-7695-3157-1 the whole document.

Se Gi Hong et al: "Accelerating Service Discovery in Ad-Hoc Zero Configuration Networking" Global Telecommunications Conference, 2007. Globecom "07. IEEE, IEEE, Piscataway, NJ, USA, Nov. 1, 2007 (Nov. 1, 2007), pp. 961- 965, XP031196113 ISBN: 978-1-4244-1042-2 abstract p. 963, left-hand column, line 22-p. 963, right-hand column, line 4.

Taiwan Search Report—TW097136234—TIPO—dated Dec. 4, 2012.

Taiwan Search Report—TW097136234—TIPO—dated Jun. 18, 2013.

Fujino N, "Proposal and Implementation of Multiple Paths Aggregation Using VPN", IPSJ SIG Technical Reports vol. 2006 No. 50, Information Processing Society of Japan, May 19, 2006, pp. 79-84.

* cited by examiner

MANAGING DISCOVERY IN A WIRELESS PEER-TO-PEER NETWORK

BACKGROUND

Field

The present disclosure relates generally to wireless communications within unplanned user deployable networks, and more specifically, to methods for managing discovery procedures in peer-to-peer wireless networks.

Background

Peer-to-peer ("P2P") networks are commonly used for connecting nodes via adhoc connections. These networks differ from the traditional client-server model where communications are usually with a central server. A peer-to-peer network may consist solely of peer nodes that communicate directly with one another, or may include a small number of servers to provide various services to the nodes in the network. These networks are useful for efficiently sharing files, media streaming, telephony, real-time data applications, and other communications.

In peer-to-peer networks supporting mobile nodes, various discovery procedures are employed as the nodes move throughout the coverage region of the network. The process of discovering nodes in the network generally begins with the broadcast of a discovery signal. If a node detects a discovery signal from another node, it may attempt to set up a communications session using paging and access mechanisms defined by the network.

In order to conserve battery power, nodes typically do not continuously broadcast a discovery signal. Instead, the node remains in a low power state, or sleep mode, most of the time and wakes up periodically to broadcast a discovery signal. This procedure has been moderately successful in reducing power consumption for a node in a non-communicative state. However, there still may be times where the node is consuming excess power. By way of example, a node that periodically broadcasts a discovery signal when it is out of the coverage region of the network is unnecessarily consuming power. Accordingly, there is a need in the art to improve the way discovery is managed in peer-to-peer networks. These improvements should be applicable to other networks as well.

SUMMARY

In an aspect of the disclosure, an apparatus for wireless communications includes a processing system configured to support a broadcast of a plurality of discovery signals spaced apart in time by silent periods, the processing system being further configured to change the duration of at least one of the silent periods.

In another aspect of the disclosure, a method of wireless communications from an apparatus includes supporting a broadcast of a plurality of discovery signals spaced apart in time by silent periods, and changing the duration of at least one of the silent periods.

In yet another aspect of the disclosure, an apparatus for wireless communications includes means for supporting a broadcast of a plurality of discovery signals spaced apart in time by silent periods, and means for changing the duration of at least one of the silent periods.

In a further aspect of the disclosure, a computer-program product for communication includes a machine-readable medium comprising instructions executable by a processing system to support a broadcast of a plurality of discovery signals spaced apart in time by silent periods, and change the duration of at least one of the silent periods.

In yet a further aspect of the disclosure, an access terminal for wireless communications includes a processing system configured to support a broadcast of a plurality of discovery signals spaced apart in time by silent periods, the processing system being further configured to change the duration of at least one of the silent periods, and a user interface supported by the processing system.

BRIEF DESCRIPTION OF THE DRAWINGS

Various aspects of a communications system are illustrated by way of example, and not by way of limitation, in the accompanying drawings, where like reference numerals may be used to denote like features throughout the specification and drawings, wherein.

In accordance with common practice, the various features illustrated in the drawings are intended as a description of various aspects of networks and network-related entities and is not intended to represent the only aspects within the scope of the claims. The drawings may include specific details for the purpose of providing a thorough understanding of a network or network-related entity, however, various aspects of the described networks and network-related entities may be implemented without these specific details. In some instances, well-known structures and components are shown in block diagram form in order to avoid obscuring various concepts described throughout this disclosure.

DETAILED DESCRIPTION

Various aspects of one or more methods and apparatuses are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect of any apparatus or method described throughout this disclosure may include a single element of any claim and/or any combination of elements in one or more claims.

In the following detailed description, various aspects of one or more methods and apparatuses will be described in the context of peer-to-peer wireless networks. However, as those skilled in the art will readily appreciate, the various aspects presented throughout this disclosure may be extended to a broad array of networks and communication protocols. Accordingly, any reference to a peer-to-peer wireless network is intended only to illustrate various aspects of a network, with the understanding that such aspects have a wide range of applications.

Figure 1:
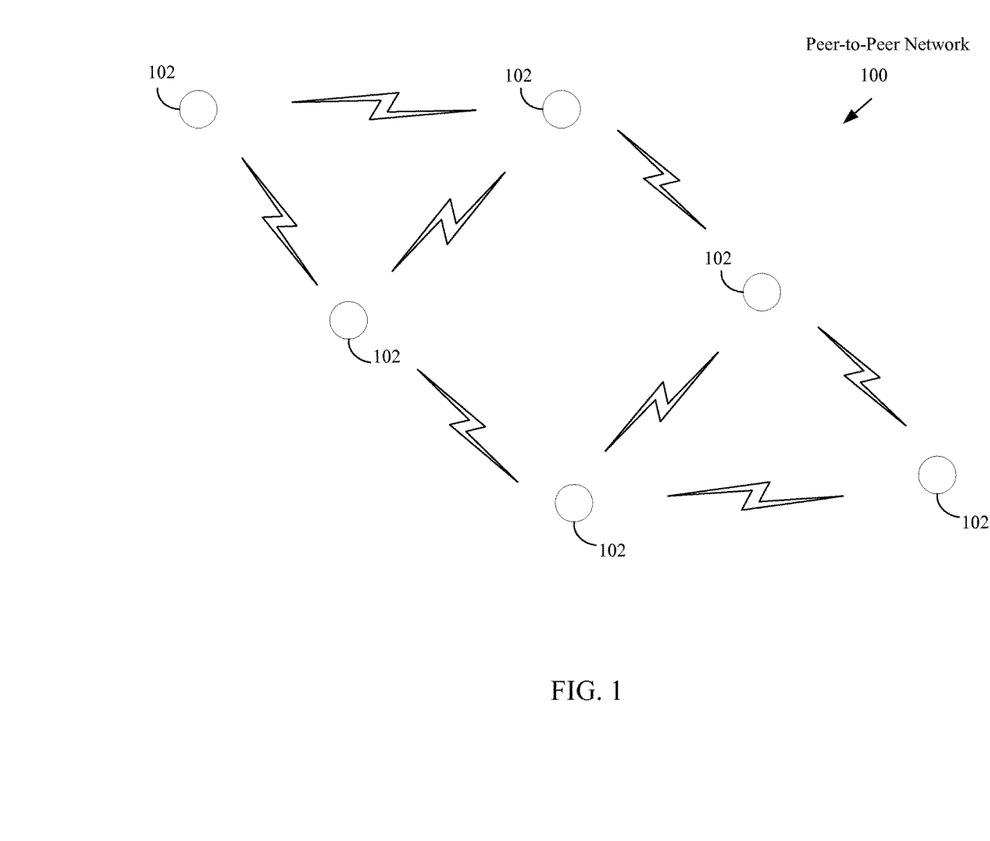
FIG. 1 is a conceptual diagram illustrating an example of a peer-to-peer wireless network.

FIG. 1 is a conceptual diagram illustrating an example of a peer-to-peer wireless network. The network 100 is shown with a number of nodes 102, each which may be configured in various fashions. By way of example, a node 102 may be configured as a laptop computer, a mobile telephone, a personal digital assistant (PDA), a digital audio player, a game console, a digital camera, a digital camcorder, a multimedia device, or any other suitable device capable of supporting a peer-to-peer connection with other nodes 102 in the network 100. The node 102 may be referred to by those skilled in the art as an access terminal, handset, wireless communications device, user terminal, user equipment, mobile station, mobile unit, subscriber unit, subscriber station, mobile radio, radio telephone, wireless station, wireless device, or some other terminology. The various concepts described throughout this disclosure are intended to apply to all nodes regardless of their specific nomenclature.

In this example, the peer-to-peer network 100 is a self-configuring network of nodes 102 connected by wireless links, which together forms an arbitrary wireless topology. A node 102 may take advantage of the wireless topology to support a connection with a peer in the network 100, either directly or through one or more intermediates nodes. In the latter case, data is routed from one node to another until the data reaches its destination. Since the nodes are free to move throughout the coverage region, the wireless topology may change rapidly. Consequently, the peer-to-peer network is dynamically reconfigurable to maintain the connection as the nodes move throughout the coverage region.

Figure 2:
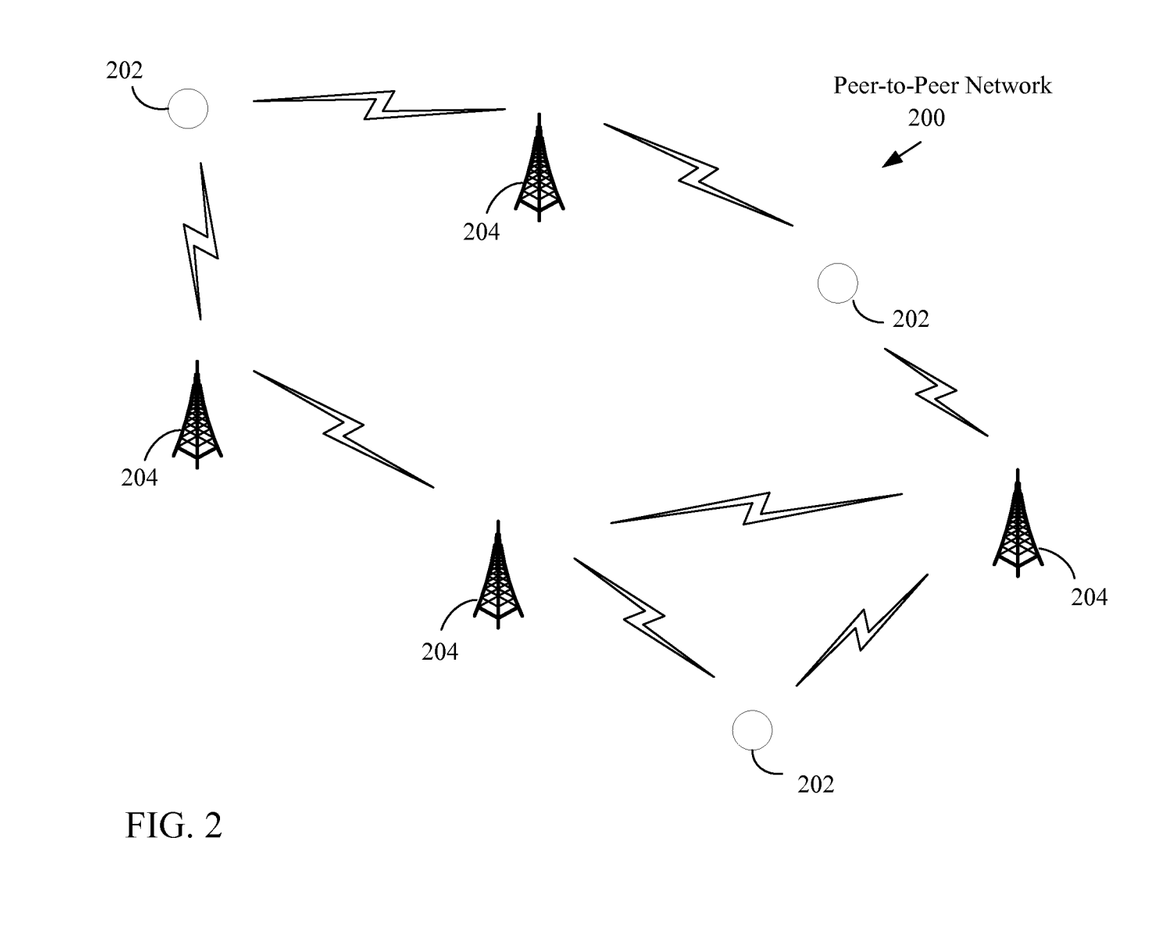
FIG. 2 is a conceptual diagram illustrating another example of a peer-to-peer wireless network.

FIG. 2 is a conceptual diagram illustrating another example of a peer-to-peer wireless network. In this example, the network 200 includes several infrastructure nodes 204, which are shown as fixed-site transceiver stations but may be implemented as mobile nodes in other configurations. An infrastructure node 204 may be referred to by those skilled in the art as an access point, relay point, NodeB, radio network controller (RNC), eNodeB, base station controller (BSC), base transceiver station (BTS), base station (BS), transceiver function (TF), radio router, radio transceiver, basic service set (BSS), extended service set (ESS), radio base station (RBS), or some other suitable terminology.

A node 202 may connect to an infrastructure node 204, or any other node in the network 200, either directly or through one or more intermediate nodes. Like the examples described earlier, the wireless topology is dynamically reconfigurable to maintain the connection as the nodes 202 move throughout the coverage region and the loading on the infrastructure nodes 204 changes. In one configuration of the network 200, the infrastructure nodes 204 may be distributed throughout a wireless wide area network (WWAN), such as might be the case in a network employing Wi-Max, Evolution-Data Optimized (EV-DO), Ultra Mobile Broadband (UMB), or some other suitable wireless standard. In another configuration of the network 200, the infrastructure nodes 204 may be distributed throughout a wireless local area network (WLAN) in a home, office building, airport, hotel, coffee shop, or other suitable private or public locale. In this example, an infrastructure node 204 may be used as an access point to a WLAN, such as by way of example, a Wi-Fi network.

Figure 3:
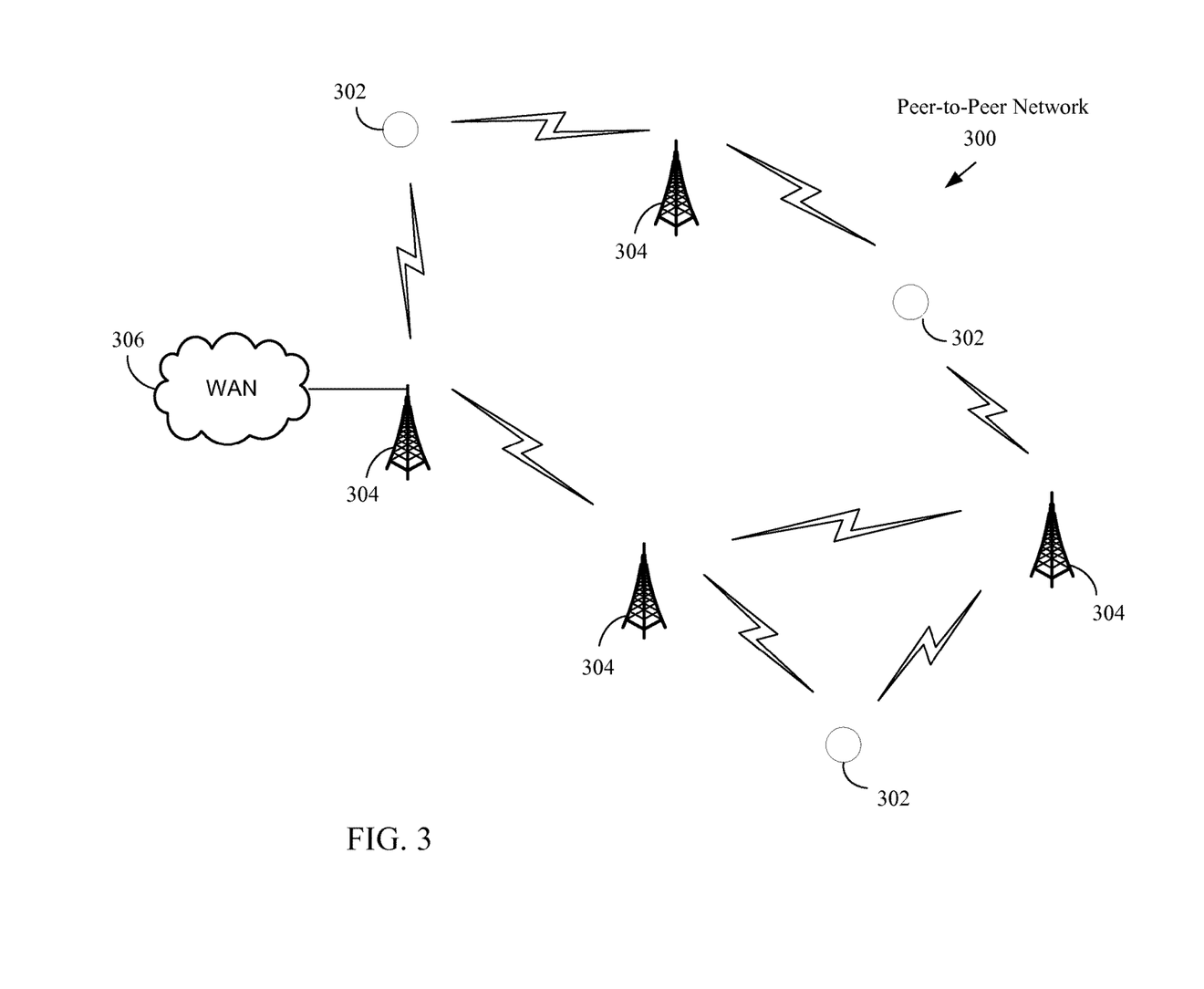
FIG. 3 is a conceptual diagram illustrating yet another example of a peer-to-peer wireless network.

The geographic reach of the peer-to-peer network 300 may be extended through a wide area network (WAN) such as the Internet or the like. An example of this peer-to-peer wireless network is shown in FIG. 3. In this configuration, any combination of nodes 302 and infrastructure nodes 304 may provide a wireless backhaul to the WAN 306 for other nodes 302. A single infrastructure node 304 may provide an access point to the WAN 306 through a wired connection as shown in FIG. 3, or alternatively, any number of infrastructure nodes 304 may have a wired or wireless connection to the WAN 306. The wireless topology is dynamically reconfigurable to maintain a connection between two nodes in the WAN 306 as those nodes, as well as others, move throughout the coverage region and the loading on the infrastructure nodes 304 varies.

When a node in one of the various network configurations described thus far, or some other suitable network configuration, initially comes on line, it attempts to discover other peers through a discovery procedure. The discovery procedure utilized by a node will depend on the type of peer connection that it wishes to establish. By way of example, the node may wish to have an anonymous connection with a peer. In this example, the node does not broadcast a discovery signal, thereby making its presence in the neighborhood anonymous. Instead, it attempts to join the network by decoding a reference signal, such as a beacon, from an infrastructure node (see FIGS. 2 and 3), or some other node or network-related entity. Once the node decodes the reference signal, it may register with the network by informing a network-related entity, such as a mobility agent, of its whereabouts so that it can be paged when another node in the network is attempting to establish a connection with it.

The discovery procedure utilized by the node may also support a peer connection with a fixed set of nodes. This discovery procedure may be well suited for a personal area network (PAN) comprising a collection of nodes owned by an individual. These nodes may include, by way of example, a laptop computer, a cellular phone, a headset, a microphone, a medical device, a biometric sensor, a heart rate monitor, a pedometer, an EKG device, a user I/O device, a watch, a remote control, a switch, a point-of-sale device, a hearing aid, a set-top box, etc. In this example, the identity of each node is known, a priori, by the other nodes via a list stored in the memory of each, or other means. In the case of a list, an in-band mechanism may be used to form the list.

When attempting to discover peers from this fixed set, a node listens for a discovery signal from its peers. A discovery signal received by the node from a peer may include a message that contains one or more attributes of the peer (e.g., a peer identifier). The node may then compare the message to a list of peers stored in memory to determine whether the peer belongs to the fixed set of nodes. If the node determines that the peer is contained in the list, the node may attempt to connect to the peer.

The node may also utilize a discovery procedure to support a peer connection with a specific type of peer where the identity of the peer is not known, a priori. This procedure may be well suited for a node that wishes to connect to a peer in a specific group, which might be the case when a node seeks local services like gaming, dating, shopping, etc. In this case, a message containing one or more attributes of peers (e.g., a group association identifier) may be included in the discovery signal broadcast by the peer. Alternatively, a network-related entity such as a server may provide assistance during the discovery procedure. In this configuration, the node may provide a message to a server which includes its location and the various attributes relating to the group association. The peer may determine its location using Global Positioning Systems (GPS), through other nodes that it is connected to, or by some other means. The server, in response to this message, may send information to the node which identifies nearby peers supporting the group association identified by the node. Preferably, the discovery procedure is configured to support a node which is a member of many groups simultaneously.

A discovery procedure may also be utilized that allows a node to connect with any other peer (i.e., no restricted association requirement). With this procedure, the node listens for discovery signals. If the node detects a discovery signal from a peer, it may attempt to establish a connection with it.

In at least one configuration of a peer-to-peer network, or other suitable network arrangement, a node may use another node to assist it with discovery. An example will now be presented with reference to FIG. 4, which illustrates a call flow between two nodes. In this example, an infrastructure node is assisting another node with discovery. However, as those skilled in the art will readily appreciate, the various concepts described in this example may be extended to any node assisting any other node in the peer-to-peer wireless network with discovery.

Figure 4:
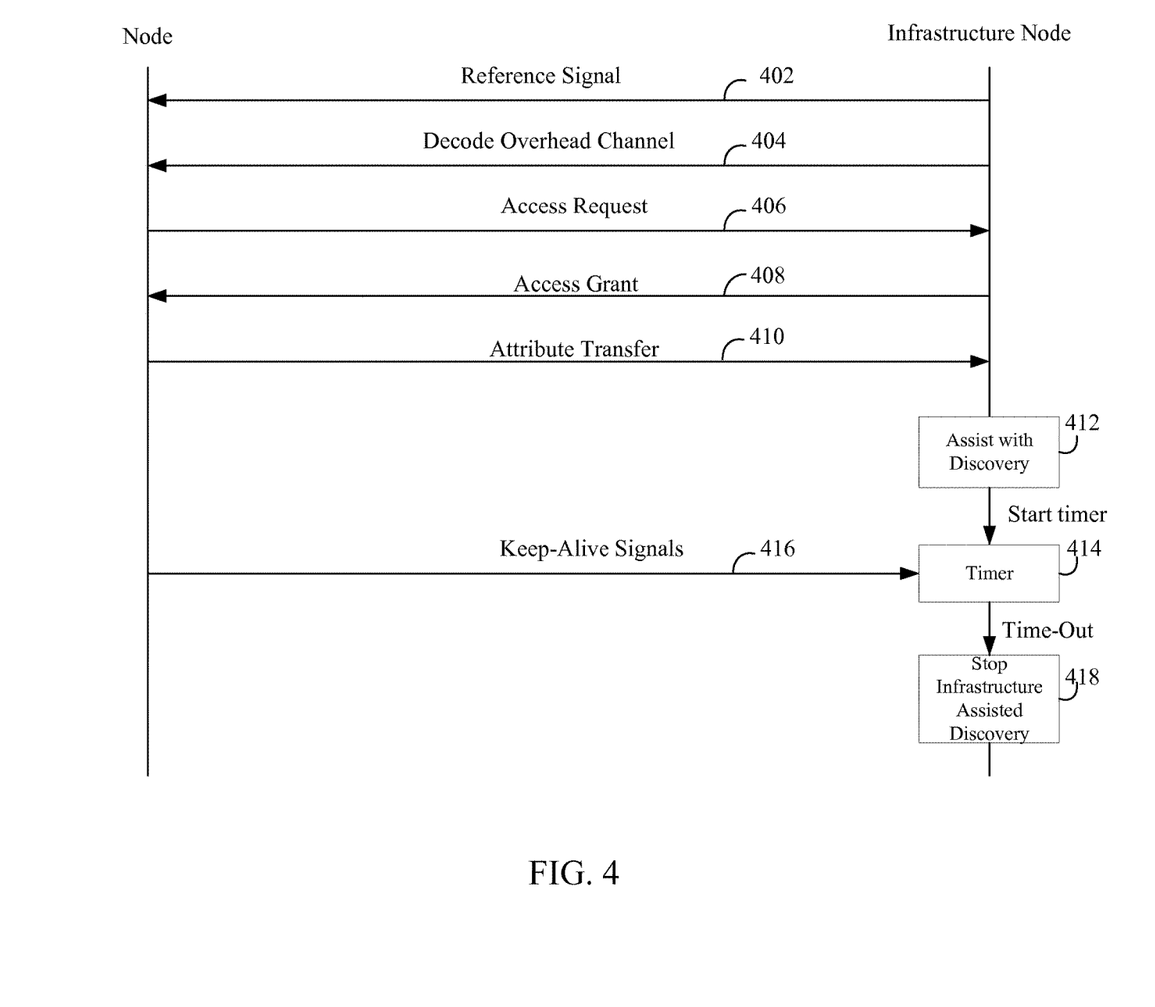
FIG. 4 is a conceptual diagram illustrating an example of a call flow for a node assisting another node with discovery in a peer-to-peer wireless network.

The following example may be useful when a node desires to conserve battery power during the discovery procedure by using an infrastructure node to broadcast its discovery signal and/or detect discovery signals from peers. Referring to FIG. 4, the node first attempts to discover an infrastructure node by decoding a reference signal broadcast from the infrastructure node as shown by arrow 402. Once the peer node discovers the infrastructure node, it may then decode an overhead channel to learn the capabilities of the infrastructure node as shown by arrow 404. The overhead channel may provide various information including whether the infrastructure node supports discovery on behalf of another node. Assuming the infrastructure node supports discovery, the node may connect to the infrastructure node by requesting access to the infrastructure node for that purpose as shown by arrow 406. The infrastructure node may respond with an access grant as shown by arrow 408. In response to the access grant, the node may communicate various attributes over a reverse link traffic channel (i.e., a traffic channel that supports a transmission from the peer node to the infrastructure node) as shown by arrow 410. These attributes may include, by way of example, a globally unique node identifier or some other identifier, a peer identifier (e.g., buddy list), group memberships, and/or any other information that is relevant to discovery.

Once this information is received, the infrastructure node may assist the node with discovery as shown by block 412. The manner in which this assistance takes place may vary. By way of example, the infrastructure node may broadcast the discovery signal for the node and the node may, on its own, listen for discovery signals from other nodes. In this example, the discovery may include information indicating that the infrastructure node is assisting the node with discovery (e.g., by setting a bit in the discovery signal broadcast by the infrastructure node). Alternatively, the node may broadcast its own discovery signal and allow the infrastructure node to listen for discovery signals from peers. Maximum assistance may be provided to the node when the infrastructure node both broadcasts the discovery signal for the node and listens for discovery signals from peers.

In at least one configuration of a peer-to-peer network, the infrastructure node may assume only a portion of the discovery for the node. By way of example, the node may broadcast the discovery signal some of the time and the infrastructure node may broadcast the discovery signal at other times. Similarly, the node may listen for discovery signal from peers some of the time and the infrastructure node may listen for discovery signals from peers at other times. Various configurations may be deployed where any combination of infrastructure assisted discovery procedures discussed thus far, and readily apparent to those skilled in the art from this disclosure, may be implemented. By way of example, the infrastructure node may broadcast the discovery signal while the responsibility for listening for discovery signals is split between the node and infrastructure node. This may be a static condition that is application specific, or alternatively, may be dynamically reconfigurable depending on channel conditions and other factors. As an example of the latter, the infrastructure node, while broadcasting discovery signals on behalf of the node, may later take on responsibility for listening to discovery signals from peers due to a change in channel conditions, a change in loading on the infrastructure node, or for some other reason.

Once an infrastructure node begins assisting another node with discovery, various mechanisms may be employed by the infrastructure node to monitor the whereabouts of the node. These mechanisms allow the infrastructure node to terminate discovery on behalf of the node when the node, by way of example, moves out of the coverage region of the infrastructure node. In at least one configuration of a peer-to-peer network, the infrastructure node maintains a timer as shown by block 414. The timer is restarted every time a keep-alive signal is received by the infrastructure node as shown by arrow 416. In this configuration, the node transmits a series of keep-alive signals to notify the infrastructure node that it still requires infrastructure assisted discovery. The keep-alive signals may be in the form of a broadcast of one or more discovery signals by the node, a transmission directed to the infrastructure node (e.g., accessing the infrastructure node, sending signals on a control channel, etc.), or some other type of signaling or communications. To conserve battery life, the node may go to sleep during all or a portion of the time between keep-alive signals. The infrastructure node stops assisting the node with discovery if the timer expires before a keep-alive signal is received as shown by block 418.

In the case where the infrastructure node is listening for discovery signals from peers on behalf of a node in the peer-to-peer network, it may notify the node upon discovering a peer. Similarly, the infrastructure node may notify the node if a peer of interest attempts to connect to the infrastructure node. The notification may take the form of a page or some other signaling. In response to the notification, an icon may appear on the display of the node indicating the presence of the peer, or a map may be presented to the display showing the peer. The node may then establish a connection with the peer, either directly, through the infrastructure node, or through one or more intermediate nodes (i.e., a multi-hop connection)

As those skilled in the art will readily appreciate, a node may be configured to support one or more of the discovery procedures discussed above. The node may also be configured to support additional discovery procedures, either instead of or in addition to, the ones described above, as well as other procedures such as paging, transmitting broadcast messages, etc.

Figure 5:
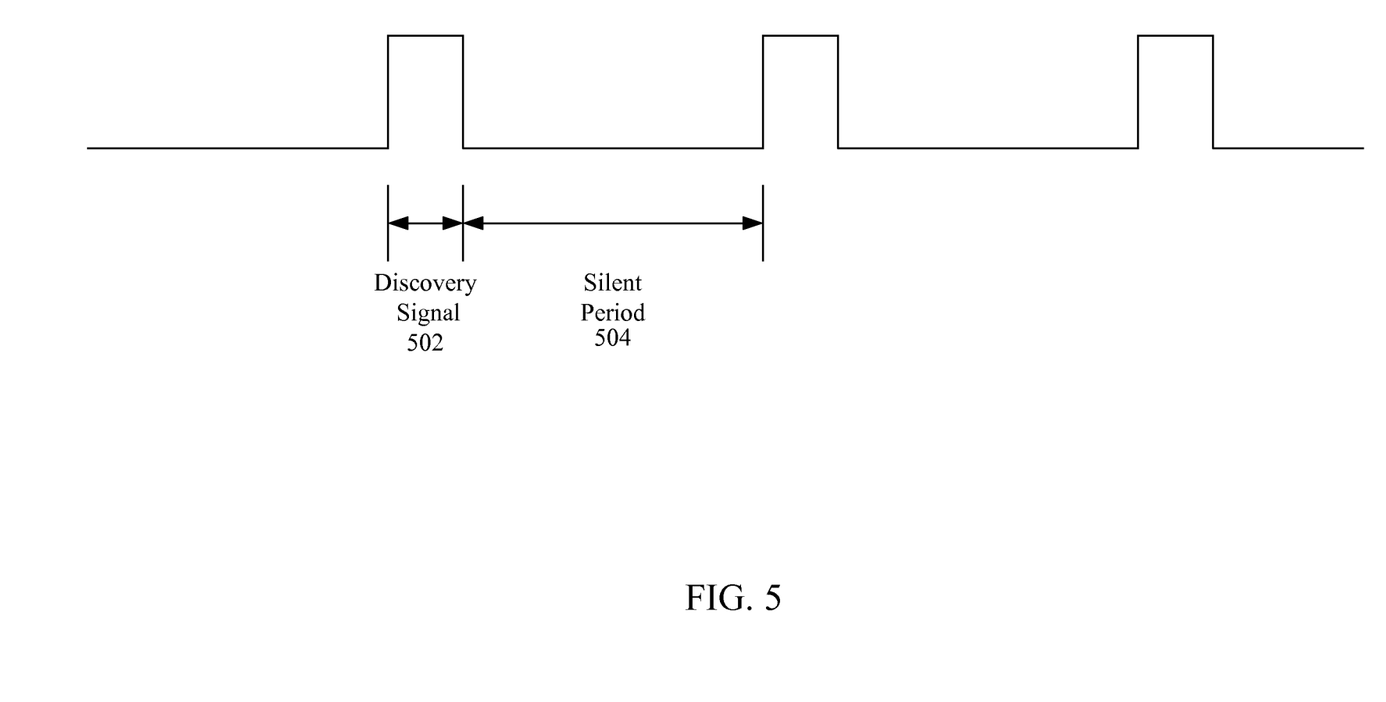
FIG. 5 is a timing diagram illustrating an example of a discovery procedure that may be implemented by a node.

FIG. 5 is a timing diagram illustrating an example of a discovery procedure that may be implemented by a node. In this example, the node supports a series of discovery signals 502 spaced apart in time by silent periods 504. The discovery signal may be a packet broadcast over a common or dedicated channel. The packet may contain a preamble comprising a pseudo-random number (PN), or multiple repetitions thereof, that is known, a priori, by all nodes in the network. During the silent periods 504, or any portion thereof, the node may also listen for discovery signals from peers. If the node detects a discovery signal from a peer, a connection may be established. In the case where the peer associates with only a fixed set of nodes, information in the discovery signal, or information provided by a server, may be used by the node to determine whether to establish a communications session. The discovery signals broadcast by the nodes may be synchronous or asynchronous, may use frequency or time reuse, and may be sent using code division multiple access (CDMA), orthogonal frequency division multiple access (OFDMA), or other suitable technologies used to support an air interface in a wireless telecommunications system.

To conserve battery power, the duration of the silent periods 504 may be varied depending on the current operating mode and/or environment. By way of example, the duration of the silent periods 504 may be increased when the battery in the peer node is fully charged and decreased when the battery is low. As another example, the duration of the silent periods 504 may be increased when the transmission power is high and decreased when the transmission power is low.

In some configurations of a node, the duration of the silent periods 504 may be changed based on the peers within radio range. By way of example, the silent periods 504 may be relatively long when the node is outside the radio range of any peers that it is authorized to communicate with. In this example, the silent periods 504 may be decreased as the node moves into radio range with one or more peer nodes to facilitate an active search. This generally requires that the node know where its peers are located relative to it, and therefore, is primarily applicable to infrastructure assisted discovery, which will now be described in connection with FIG. 5.

Figure 6:
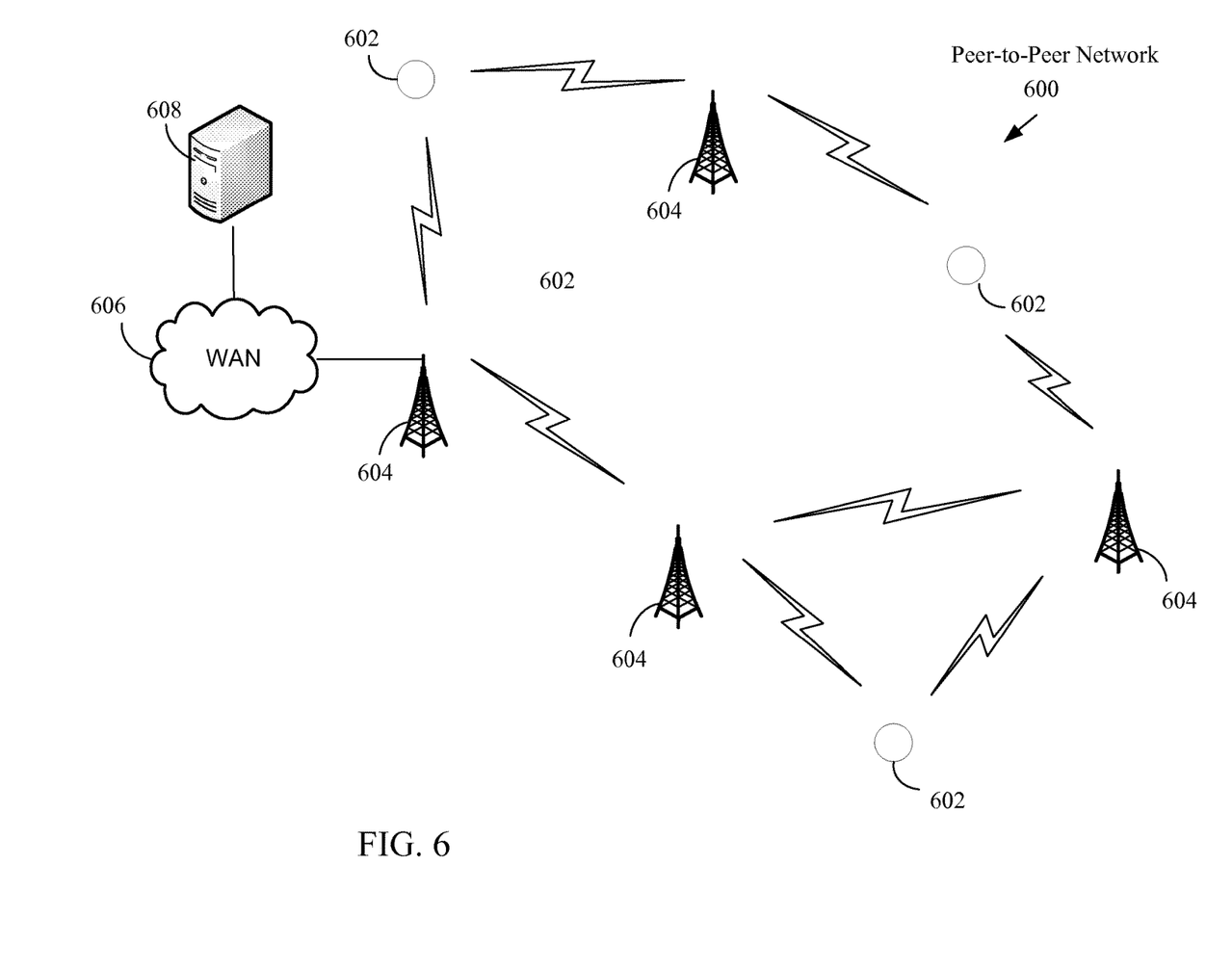
FIG. 6 is a conceptual diagram illustrating an example of a peer-to-peer wireless network supporting infrastructure assisted discovery.

FIG. 6 is a conceptual diagram illustrating an example of a peer-to-peer wireless network 600 supporting infrastructure assisted discovery. In this example, a node 602 registers with a discovery server 608. The discovery server 608 may be dependant on the type of services required by the node 602. By way of example, a node 602 seeking a connection to a peer in a specific group to access local services such as gaming, dating, shopping, etc., may access a specific server configured to support these services. Alternatively, a single server may be used. In the latter configuration, the peer 602 may send a profile which includes the types of services it requires when registering with the server 608.

The registration procedure may be implemented in various ways. By way of example, the node 602 may send a registration message to the server 608, which includes its location. Using the node's location contained in the registration message, the server 608 may respond by sending a list of peers in the vicinity of the node 602. The node 602 may query the server 608 to update its list as either it or its peers move throughout the network 600. In at least one configuration of a wireless peer-to-peer network, the list may also be updated when one or more peers move into or out of the vicinity of the node.

Returning to FIG. 5, the node may have relatively long silent periods when it is not in radio range with any peers that it is authorized to communicate with. In this mode, the node should broadcast a discovery signal only when it has a peer in its vicinity that it has not yet discovered, or the infrastructure assisted discovery is unreliable or unavailable. As the node moves into radio range with one or more peers, it may begin to actively search by decreasing the silent periods. Once the node discovers a peer node to connect with, it may then increase the duration of the silent periods. Alternatively, the node may be configured to increase the duration of the silent periods only after it discovers all peers in its network. In some configurations, the node may cease broadcasting a discovery signal all together, but it may be desirable to maintain discovery signal broadcasts separated by long silent periods to notify the peers that it has not moved out of radio range.

The change in the duration of the silent periods from discovery signal to discovery signal may be fixed or variable. In the latter case, the silent periods may become progressively shorter once the peer node moves into radio range with the peer nodes. The silent periods may be progressively shortened on a random basis, or alternatively, in accordance with a linear, polynomial, or exponential function, or some other function.

Figure 7:
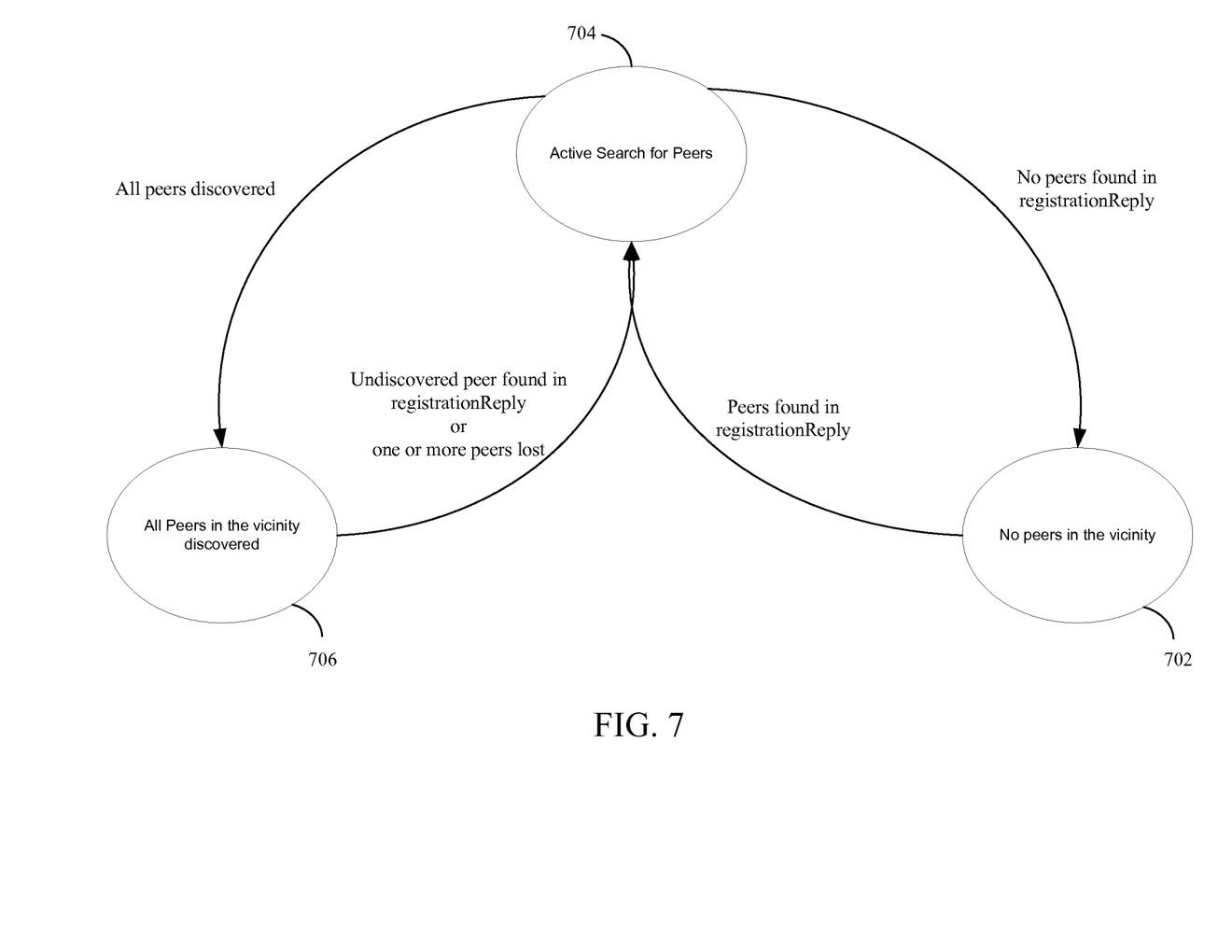
FIG. 7 is a state diagram illustrating an example of a discovery procedure implemented by a node a peer-to-peer wireless network.

FIG. 7 is a state diagram illustrating an example of a discovery procedure implemented by a node in a peer-to-peer wireless network. Each state defines a different periodicity for broadcasting discovery signals.

In this example, the node is in a first state 702 when no peers are in the vicinity. In this state, the discovery signal is sent out infrequently. The node may periodically send its location to a server via a registration message. A registration reply, or other message, may be sent back to the node identifying any peers in the vicinity. If there are no peers in the vicinity, then the node remains in the first state 702. If, on the other hand, the server indentifies one or more peers in the vicinity, the node enters a second state 704 where the frequency of the discovery signal is increased to actively search for the peers.

While the node is in the second state 704, it continues to periodically register with the server. If a registration reply is received from the server which indicates that there are no longer any peers in the vicinity, the node returns to the first state 702. Conversely, if the node is able to discover all of the peers identified in the registration reply from the server, it enters into a third state 706 where the frequency of the discovery signal is reduced. Should one or more peers be lost, or an undiscovered peer identified in a subsequent registration reply, then the node returns to the second state 704 to actively search by increasing the frequency of the discovery signal. Alternatively, instead of registering with the server periodically, the server may push the information to the node in the event that a peer enters or leaves the vicinity.

Figure 8:
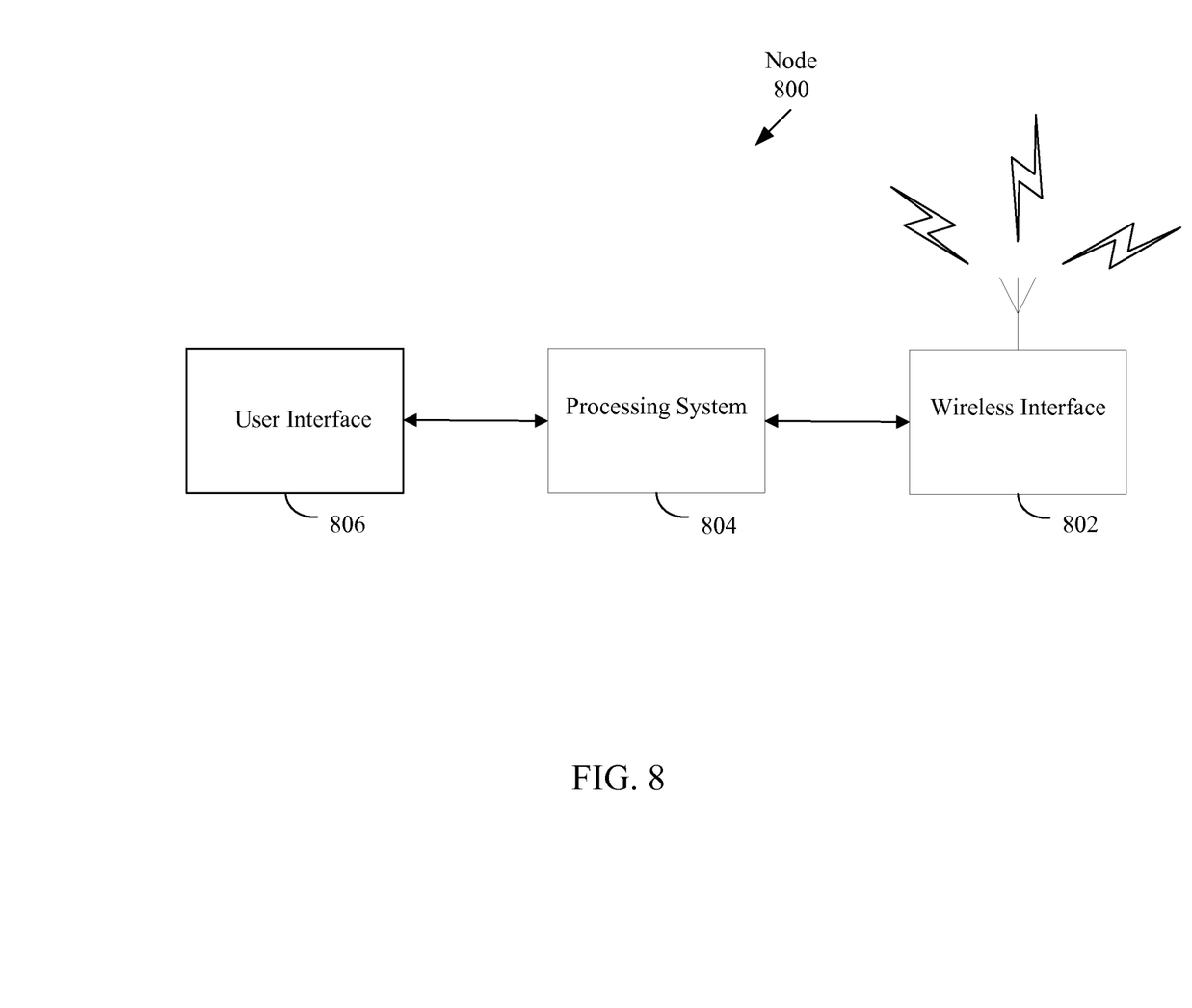
FIG. 8 is a block diagram illustrating an example of the functionality of a node.

FIG. 8 is a block diagram illustrating an example of the functionality of a node. The following description of a node 800 is informative in nature and broadly defines the functionality of each block. Only the functionality pertinent to various concepts disclosed herein will be described. Those skilled in the art will recognize that these functional blocks can provide other functionality that is not described herein. In this example, the node 800 is an access terminal, which includes three functional blocks: a wireless interface 802, a processing system 804, and a user interface 806.

The wireless interface 802 may be configured as a transceiver that provides both a transmitting and receiving function. The transmitting function includes modulating a carrier with data. The receiving function includes demodulating a carrier to recover data. The wireless interface 802 may also provide various other functions, such as RF front-end processing, analog/digital conversion, timing and frequency estimation, channel estimation, turbo coding etc. In summary, the wireless interface 802 may be configured to provide the complete physical layer implementation of the access terminal 800.

The processing system 804, either alone or in combination with other entities in the access terminal 800, may be configured to implement all functionality above the physical layer. Alternatively, the processing system 804 may also implement all or part of the physical layer. In the most general terms, the processing system 804 is configured to use the transmitting and receiving functions of the wireless interface 802 to support communications. In addition, the processing system 804 may be configured to support a broadcast of a plurality of discovery signals spaced apart in time by silent periods and change the duration of at least one of the silent periods. The term "silent period" as used throughout this disclosure relates to discovery. In other words, when the processing system in a silent period, it is not generating a discovery signal, although it may engage in other broadcasts and/or transmissions. Moreover, the change in duration of the silent periods means the duration between the discovery signals generated by the processing system regardless of the timing for the actual broadcasts of the discovery signal by the wireless interface. In some configurations, a processing system may enter into a sleep mode (i.e., low power state) during all or any portion of a silent period to conserve battery power.

The processing system 804 may be implemented using software, hardware, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

The node 800, when functioning as an access terminal, may also include a user interface 806. The user interface 806 may include a display, keypad, speaker, microphone, and/or any other suitable interface that enables a user to operate the access terminal. The user interface 806 is used to control the data that is transmitted and received by the processing system 804 over a radio link by the wireless interface 802.

Figure 9:
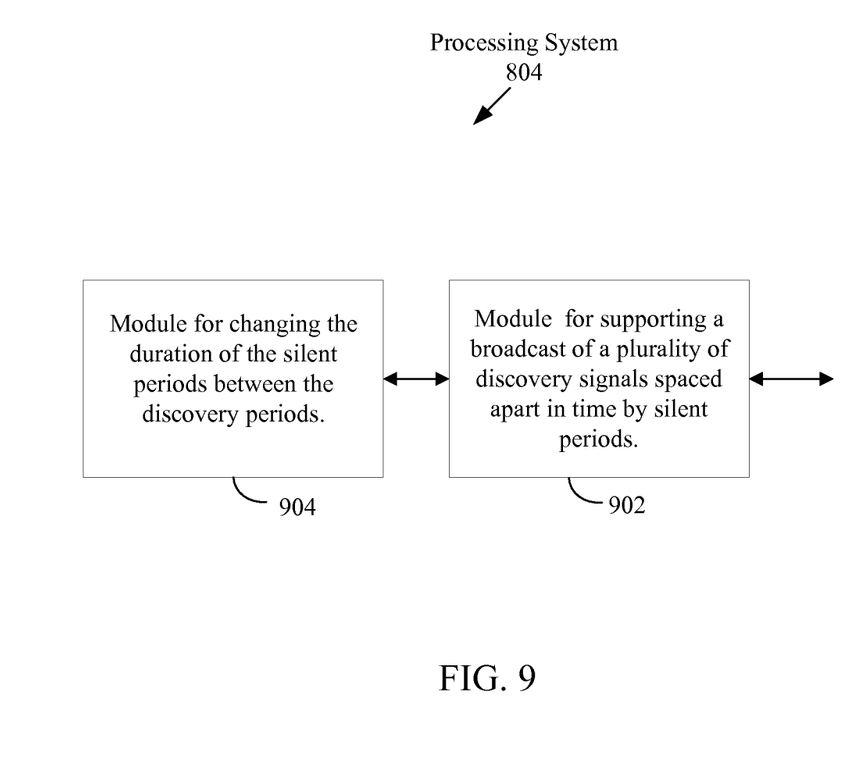
FIG. 9 is a block diagram illustrating an example of the functionality of a processing system.

FIG. 9 is a block diagram illustrating an example of the functionality of a processing system 804. In this example, the processing system 804 includes a module 902 for supporting a broadcast of a plurality of discovery signals spaced apart in time by silent periods and a module 904 for changing the duration of the silent periods between the discovery signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
   a processing system configured to:
      support a broadcast of a plurality of discovery signals spaced apart in time by silent periods, wherein the plurality of discovery signals support discovery of one or more mobile nodes in a dynamically configurable wireless network;
      provide a message to a server relating to a location of the apparatus;
      receive a list from the server in response to the message, the list indicating whether the one or more mobile nodes are within a vicinity of the apparatus;
      in response to a determination, based on the list, that the one or more mobile nodes are not within the vicinity of the apparatus, remain in a first state where a duration of the silent periods is maintained;

in response to a determination, based on the list, that the one or more mobile nodes are within the vicinity of the apparatus, enter a second state that includes, in response to a determination that the apparatus is moving from a location outside a radio range of the one or more mobile nodes to a location within radio range of the one or more mobile nodes, change the duration of the silent periods from discovery signal to discovery signal of the plurality of discovery signals such that the duration for the silent periods decreases progressively from discovery signal to discovery signal of the plurality of discovery signals; and in response to a determination that discovery of all of the one or more mobile nodes identified in the list has been completed, enter a third state that includes increasing the duration of the silent periods.

2. The apparatus of claim 1 wherein the processing system is further configured to receive a discovery signal from one or more nodes.

3. The apparatus of claim 2 wherein the processing system is further configured to support a connection to one of the one or more nodes in response to receiving the discovery signal from said one of the one or more nodes.

4. The apparatus of claim 2 wherein the processing system is further configured to determine whether the discovery signal received from one of the one or more nodes belongs to a specific set of nodes.

5. The apparatus of claim 2 wherein the processing system is further configured to determine whether the discovery signal received from one of the one or more nodes belongs to the specific set of nodes based on information received from the server.

6. The apparatus of claim 5 wherein the processing system is further configured to provide the message to the server relating to the location of the apparatus and to receive the information from the server in response to the message.

7. The apparatus of claim 1 wherein the processing system is further configured to enter a sleep mode during at least a portion of each of the silent periods.

8. The apparatus of claim 1 wherein the processing system is further configured to determine that the apparatus is moving from the location outside the radio range of the one or more mobile nodes to the location within the radio range of the one or more mobile nodes based on a discovery signal received from each of at least one of the one or more mobile nodes.

9. The apparatus of claim 1 wherein the processing system is further configured to determine that the apparatus is moving from the location outside the radio range of the one or more mobile nodes to the location within the radio range of the one or more mobile nodes based on information received from the server.

10. The apparatus of claim 1 further comprising a power source, wherein the processing system is further configured to change the duration of the silent periods as a function of the power source.

11. The apparatus of claim 1 further comprising a transmitter having a transmission power, wherein the processing system is further configured to change the duration of the silent periods as a function of the transmission power.

12. The apparatus of claim 1 wherein the processing system is further configured to decrease the duration of the silent periods from discovery signal to discovery signal of the plurality of discovery signals in accordance with a non-linear function that comprises a random, polynomial, or exponential function.

13. The apparatus of claim 1, wherein the processing system is further configured to:
periodically send a registration message to the server while in the apparatus is in the second state;
receive a reply from the server in response to registration message, wherein the reply indicates that the one or more mobile nodes are no longer in the vicinity of the apparatus; and
enter the first state in response to the reply indicating that the one or more nodes are no longer in the vicinity of the apparatus.

14. A method of wireless communications from an apparatus, comprising:
supporting a broadcast of a plurality of discovery signals spaced apart in time by silent periods, wherein the plurality of discovery signals support discovery of mobile nodes in a dynamically configurable wireless network;
providing a message to a server relating to a location of the apparatus;
receiving a list from the server in response to the message, the list indicating whether the one or more mobile nodes are within a vicinity of the apparatus;
in response to a determination, based on the list, that the one or more mobile nodes are not within the vicinity of the apparatus, remaining in a first state where a duration of the silent periods is maintained;
in response to a determination, based on the list, that the one or more mobile nodes are within the vicinity of the apparatus, entering a second state that includes, in response to a determination that the apparatus is moving from a location outside a radio range of the one or more mobile nodes to a location within radio range of the one or more mobile nodes, changing the duration of the silent periods from discovery signal to discovery signal of the plurality of discovery signals such that the duration for the silent periods decreases progressively from discovery signal to discovery signal of the plurality of discovery signals; and
in response to a determination that discovery of all of the one or more mobile nodes identified in the list has been completed, entering a third state that includes increasing the duration of the silent periods.

15. The method of claim 14 further comprising receiving a discovery signal from one or more nodes.

16. The method of claim 15 further comprising supporting a connection to one of the one or more nodes in response to receiving the discovery signal from said one of the one or more nodes.

17. The method of claim 15 further comprising determining whether the discovery signal received from one of the one or more nodes belongs to a specific set of nodes.

18. The method of claim 15 further comprising determining whether the discovery signal received from one of the one or more nodes belongs to the specific set of nodes is based on information received from the server.

19. The method of claim 18 further comprising providing the message to the server relating to the location of the apparatus and receiving the information from the server in response to the message.

20. The method of claim 14 further comprising entering a sleep mode during at least a portion of each of the silent periods.

21. The method of claim 14 further comprising determining that the apparatus is moving from the location outside the radio range of the one or more mobile nodes to the location within the radio range of the one or more mobile nodes based on a discovery signal received from each of at least one of the one or more mobile nodes.

22. The method of claim 14 further comprising determining that the apparatus is moving from the location outside the radio range of the one or more mobile nodes to the location within the radio range of the one or more mobile nodes based on information received from the server.

23. The method of claim 14 wherein the apparatus comprises a power source, wherein the duration of the silent periods is changed as a function of the power source.

24. The method of claim 14 wherein the apparatus further comprises a transmitter having a transmission power, wherein the duration of the silent periods as a function of the transmission power.

25. The method of claim 14 wherein the decrease of the duration of the silent periods from discovery signal to discovery signal of the plurality of discovery signals is decreased in accordance with a non-linear function that comprises a random, polynomial, or exponential function.

26. A computer-program product for supporting wireless communication, comprising:
    a non-transitory machine-readable medium comprising instructions executable by a processing system to:
    support a broadcast of a plurality of discovery signals spaced apart in time by silent periods, wherein the plurality of discovery signals support discovery of mobile nodes in a dynamically configurable wireless network;
    provide a message to a server relating to a location of the apparatus;
    receive a list from the server in response to the message, the list indicating whether the one or more mobile nodes are within a vicinity of the apparatus;
    in response to a determination, based on the list, that the one or more mobile nodes are not within the vicinity of the apparatus, remain in a first state where a duration of the silent periods is maintained;
    in response to a determination, based on the list, that the one or more mobile nodes are within the vicinity of the apparatus, enter a second state that includes, in response to a determination that an apparatus is moving from a location outside a radio range of the one or more mobile nodes to a location within radio range of the one or more mobile nodes, change the duration of the silent periods from discovery signal to discovery signal of the plurality of discovery signals such that the durations for the silent periods decrease progressively from discovery signal to discovery signal of the plurality of discovery signals; and
    in response to a determination that discovery of all of the one or more mobile nodes identified in the list has been completed, enter a third state that includes increasing the duration of the silent periods.

27. An access terminal for wireless communications, comprising:
    a processor and memory configured to support a broadcast of a plurality of discovery signals spaced apart in time by silent periods, wherein the plurality of discovery signals support discovery of mobile nodes in a dynamically configurable wireless network, the processor and memory being further configured to direct the access terminal to:
    provide a message to a server relating to a location of the access terminal;
    receive a list from the server in response to the message, the list indicating whether the one or more mobile nodes are within a vicinity of the access terminal;
    in response to a determination, based on the list, that the one or more mobile nodes are not within the vicinity of the, remain in a first state where a duration of the silent periods is maintained;
    in response to a determination, based on the list, that the one or more mobile nodes are within the vicinity of the access terminal, enter a second state that includes, in response to a determination that the access terminal is moving from a location outside a radio range of the one or more mobile nodes to a location within radio range of the one or more mobile nodes, change the duration of the silent periods from discovery signal to discovery signal of the plurality of discovery signals such that the durations for the silent periods decrease progressively from discovery signal to discovery signal of the plurality of discovery signals; and
    in response to a determination that discovery of all of the one or more mobile nodes identified in the list has been completed, enter a third state that includes increasing the duration of the silent period.

28. The access terminal of claim 27 wherein the processor and memory are further configured to direct the access terminal to receive a discovery signal from one or more nodes.

29. The access terminal of claim 28 wherein the processor and memory are further configured to direct the access terminal to support a connection to one of the one or more nodes in response to receiving the discovery signal from said one of the one or more nodes.

30. The access terminal of claim 28 wherein the processor and memory are further configured to direct the access terminal to determine whether the discovery signal received from one of the one or more nodes belongs to a specific set of nodes.

31. The access terminal of claim 28 wherein the wherein the processor and memory are further configured to direct the access terminal to determine whether the discovery signal received from one of the one or more nodes belongs to the specific set of nodes based on information received from the server.

32. The access terminal of claim 31 wherein the processor and memory are further configured to direct the access terminal to provide the message to the server relating to the location of the access terminal and means for receiving the information from the server in response to the message.

33. The access terminal of claim 27 wherein the processor and memory are further configured to direct the access terminal to enter a sleep mode during at least a portion of each of the silent periods.

34. The access terminal of claim 27 wherein the processor and memory are further configured to direct the access terminal to determine that the access terminal is moving from the location outside the radio range of the one or more mobile nodes to the location within the radio range of the one or more mobile nodes based on a discovery signal received from each of at least one of the one or more mobile nodes.

35. The access terminal of claim 27 wherein the processor and memory are further configured to direct the access terminal to determine that the access terminal is moving from the location outside the radio range of the one or more mobile nodes to the location within the radio range of the one or more mobile nodes based on information received from the server.

36. The access terminal of claim 27 further comprising a power source for providing power to the apparatus, wherein the processor and memory are further configured to direct the access terminal to change the duration of the silent periods as a function of a power source.

37. The access terminal of claim 27 wherein the processor and memory are further configured to direct the access terminal to transmit a signal at a transmission power, and to change the duration of the silent periods as a function of the transmission power.

38. The access terminal of claim 27 wherein the means for changing the duration is configured to decrease the duration of the silent periods from discovery signal to discovery signal of the plurality of discovery signals in accordance with a non-linear function that comprises a random, polynomial, or exponential function.

* * * * *